US012719685B2

(12) United States Patent
Patil et al.

(10) Patent No.: US 12,719,685 B2
(45) Date of Patent: Aug. 25, 2026

(54) USER-FRIENDLY, SECURE AND AUDITABLE CRYPTOGRAPHY ADMINISTRATION SYSTEM

(71) Applicant: Palantir Technologies Inc., Denver, CO (US)

(72) Inventors: Mihir Patil, New York, NY (US); Hugo Dobbelaere, Paris (FR); Yeong Wei Wee, Singapore (SG); Maia Hamin, Amherst, MA (US); Piotr Kraus, London (GB); Yurii Mashtalir, Paris (FR); Hussein Farah, London (GB); Alexander Galimberti, London (GB); Caterina Wanka, Munich (DE); Lukas Czypulovski, Munich (DE); Juraj Micko, Baska (SK); Nezihe Pehlivan, London (GB)

(73) Assignee: Palantir Technologies Inc., Aventura, FL (US)

( * ) Notice: Subject to any disclaimer, the term of this patent is extended or adjusted under 35 U.S.C. 154(b) by 123 days.

(21) Appl. No.: 18/654,469

(22) Filed: May 3, 2024

(65) Prior Publication Data

US 2024/0283652 A1 Aug. 22, 2024

Related U.S. Application Data

(63) Continuation of application No. 17/502,624, filed on Oct. 15, 2021, now Pat. No. 12,010,232.

(30) Foreign Application Priority Data

Sep. 30, 2021 (EP) .................................... 21315191

(51) Int. Cl.

| | |
|---|---|
| ***H04L 9/32*** | (2006.01) |
| ***G06F 21/10*** | (2013.01) |
| ***H04L 9/08*** | (2006.01) |

(52) U.S. Cl.
CPC ........... *H04L 9/3215* (2013.01); *G06F 21/10* (2013.01); *H04L 9/0861* (2013.01); *H04L 9/0894* (2013.01); *H04L 2209/60* (2013.01)

(58) Field of Classification Search
None
See application file for complete search history.

(56) References Cited

U.S. PATENT DOCUMENTS

| | | | | |
|---|---|---|---|---|
| 7,373,517 | B1 | 5/2008 | Riggins | |
| 8,458,487 | B1 * | 6/2013 | Palgon .................... | G06F 21/00 713/193 |

(Continued)

FOREIGN PATENT DOCUMENTS

| | | |
|---|---|---|
| EP | 4 160 450 | 4/2023 |

OTHER PUBLICATIONS

Official Communication for European Patent Application No. 21315191.3 dated Apr. 21, 2022, 7 pages.

*Primary Examiner* — Michael Pyzocha
(74) *Attorney, Agent, or Firm* — Knobbe, Martens, Olson & Bear, LLP

(57) ABSTRACT

A cryptography administration system facilitates secure, user-friendly and auditable cryptography. The system can generate an encrypted data value from raw data values with a user-selected cryptography algorithm. The encrypted data value can comprise a pointer configured to access a location in storage comprising a cryptography key for decrypting the encrypted data value. The system can generate a license comprising one or more permissions of a user to decrypt the encrypted data value. The system can store the license in the location in storage accessible by the pointer of the encrypted data value.

17 Claims, 12 Drawing Sheets

(56) References Cited

U.S. PATENT DOCUMENTS 8,542,823 B1 9/2013 Nguyen
8,600,895 B2 12/2013 Felsher
9,317,715 B2 * 4/2016 Schuette ............. G06F 21/6254
9,682,590 B1 * 6/2017 Ramarao ................ G06Q 10/00
10,320,761 B2 * 6/2019 Ye ....................... H04L 63/0281
10,430,350 B1 * 10/2019 Nimry ..................... G06F 21/78
12,010,232 B2 6/2024 Patil et al.
2001/0042124 A1 * 11/2001 Barron .................. G06F 21/606 709/227
2005/0039034 A1 2/2005 Doyle
2007/0154018 A1 7/2007 Watanabe
2008/0040603 A1 2/2008 Stedron
2008/0077806 A1 3/2008 Cui
2008/0310635 A1 12/2008 Acuna et al.
2009/0228450 A1 * 9/2009 Zhang ..................... G06F 21/10 713/168
2009/0327739 A1 * 12/2009 Relyea ................ H04L 63/0876 713/182
2010/0146582 A1 6/2010 Jaber et al.
2010/0257372 A1 10/2010 Seifert
2011/0040967 A1 2/2011 Waller et al.
2011/0066844 A1 * 3/2011 O'Toole, Jr. ........... G06Q 40/03 713/153
2011/0276808 A1 * 11/2011 Yuki ..................... G06F 21/105 713/191
2011/0289309 A1 * 11/2011 Tanenbaum .......... H04L 63/045 713/150
2012/0070001 A1 * 3/2012 Blot-Lefevre .......... H04L 67/06 380/259
2012/0110174 A1 * 5/2012 Wootton ............. H04L 63/1416 709/224
2013/0019096 A1 1/2013 Palzer et al.
2013/0145177 A1 6/2013 Cordella et al.
2013/0239230 A1 9/2013 Herbach et al.
2014/0208418 A1 * 7/2014 Libin .................. G06F 21/6209 726/19
2015/0119000 A1 * 4/2015 Miao .................. H04N 21/4367 455/411
2015/0163206 A1 6/2015 McCarthy et al.
2015/0199496 A1 7/2015 Deter et al.
2016/0028698 A1 1/2016 Antipa et al.
2016/0117495 A1 * 4/2016 Li ....................... G06F 21/6209 726/1
2016/0321290 A1 * 11/2016 Luthra .................. G06F 16/172
2017/0046531 A1 2/2017 Roberts
2017/0126638 A1 5/2017 Ye et al.
2017/0324566 A1 11/2017 Kawasaki et al.
2018/0034792 A1 * 2/2018 Gupta ................... G06F 21/602
2018/0144148 A1 * 5/2018 Rattan ................. G06F 21/6209
2018/0189502 A1 * 7/2018 Kumar .................. H04L 9/0863
2018/0189505 A1 * 7/2018 Ghafourifar ........ G06F 21/6209
2021/0126774 A1 4/2021 Galligan et al.
2022/0353250 A1 * 11/2022 Hikichi ................. H04L 63/166
2022/0382883 A1 12/2022 Lam
2023/0100790 A1 3/2023 Patil et al.

* cited by examiner

| | Account_Number | Full_Name | Street |
|---|---|---|---|
| 1 | LK89569 | Cindy | 1897 Waters Isle |
| 2 | TM85269 | Vaughn | 813 Giovanny Burg |
| 3 | BE93150 | Alia Rod | 759 Reilly Track |
| 4 | GS53530 | Katlyn | 3852 Lon Land |
| 5 | PY42445 | Jordane | 694 Jakubowski valleys |
| 6 | RO13546 | Mrs.Devon | 9663 Littel mountain |
| 7 | TW93699 | Joe | 4438 Schmeter Valleys |

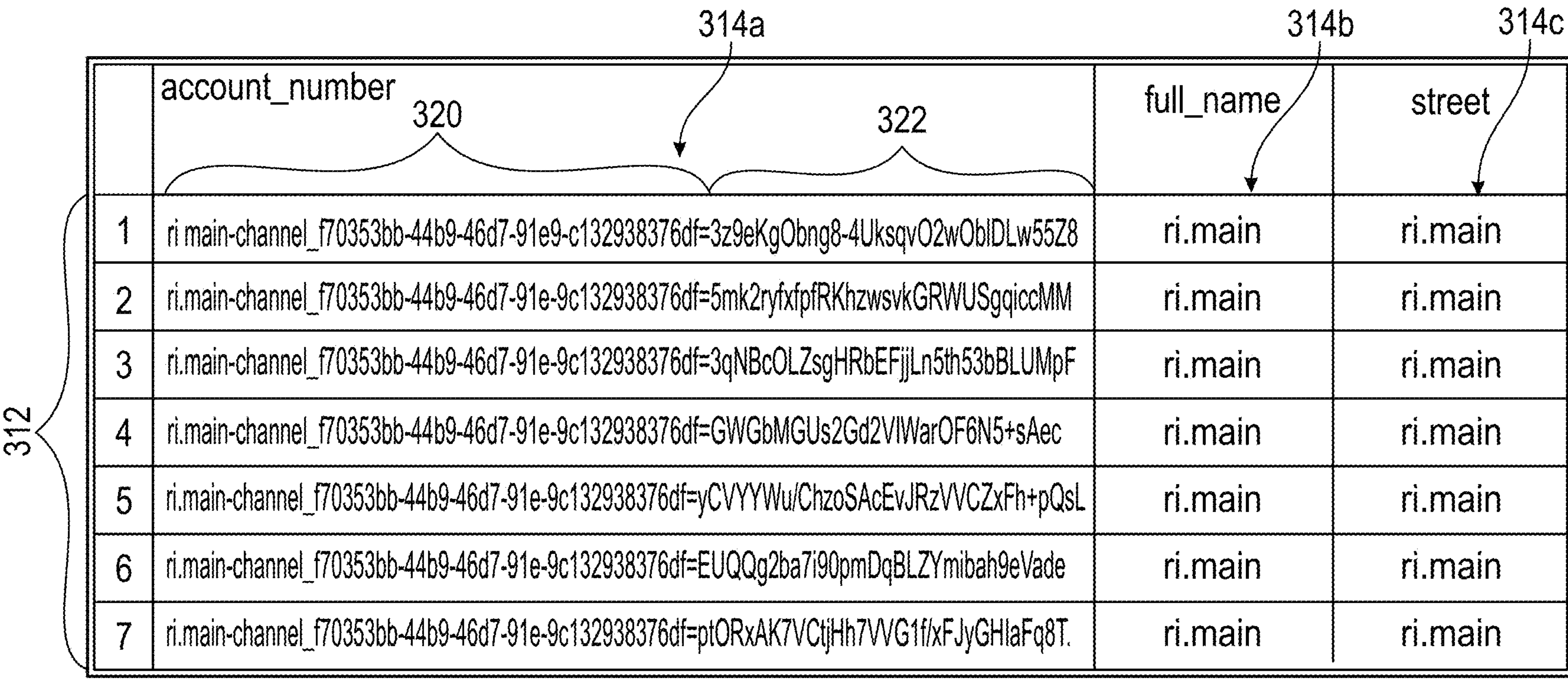

| | account_number | full_name | street |
|---|---|---|---|
| 1 | ri main-channel_f70353bb-44b9-46d7-91e9-c132938376df=3z9eKgObng8-4UksqvO2wOblDLw55Z8 | ri.main | ri.main |
| 2 | ri.main-channel_f70353bb-44b9-46d7-91e-9c132938376df=5mk2ryfxfpfRKhzwsvkGRWUSgqiccMM | ri.main | ri.main |
| 3 | ri.main-channel_f70353bb-44b9-46d7-91e-9c132938376df=3qNBcOLZsgHRbEFjjLn5th53bBLUMpF | ri.main | ri.main |
| 4 | ri.main-channel_f70353bb-44b9-46d7-91e-9c132938376df=GWGbMGUs2Gd2VlWarOF6N5+sAec | ri.main | ri.main |
| 5 | ri.main-channel_f70353bb-44b9-46d7-91e-9c132938376df=yCVYYWu/ChzoSAcEvJRzVVCZxFh+pQsL | ri.main | ri.main |
| 6 | ri.main-channel_f70353bb-44b9-46d7-91e-9c132938376df=EUQQg2ba7i90pmDqBLZYmibah9eVade | ri.main | ri.main |
| 7 | ri.main-channel_f70353bb-44b9-46d7-91e-9c132938376df=ptORxAK7VCtjHh7VVG1f/xFJyGHIaFq8T. | ri.main | ri.main |

Figure 7B:
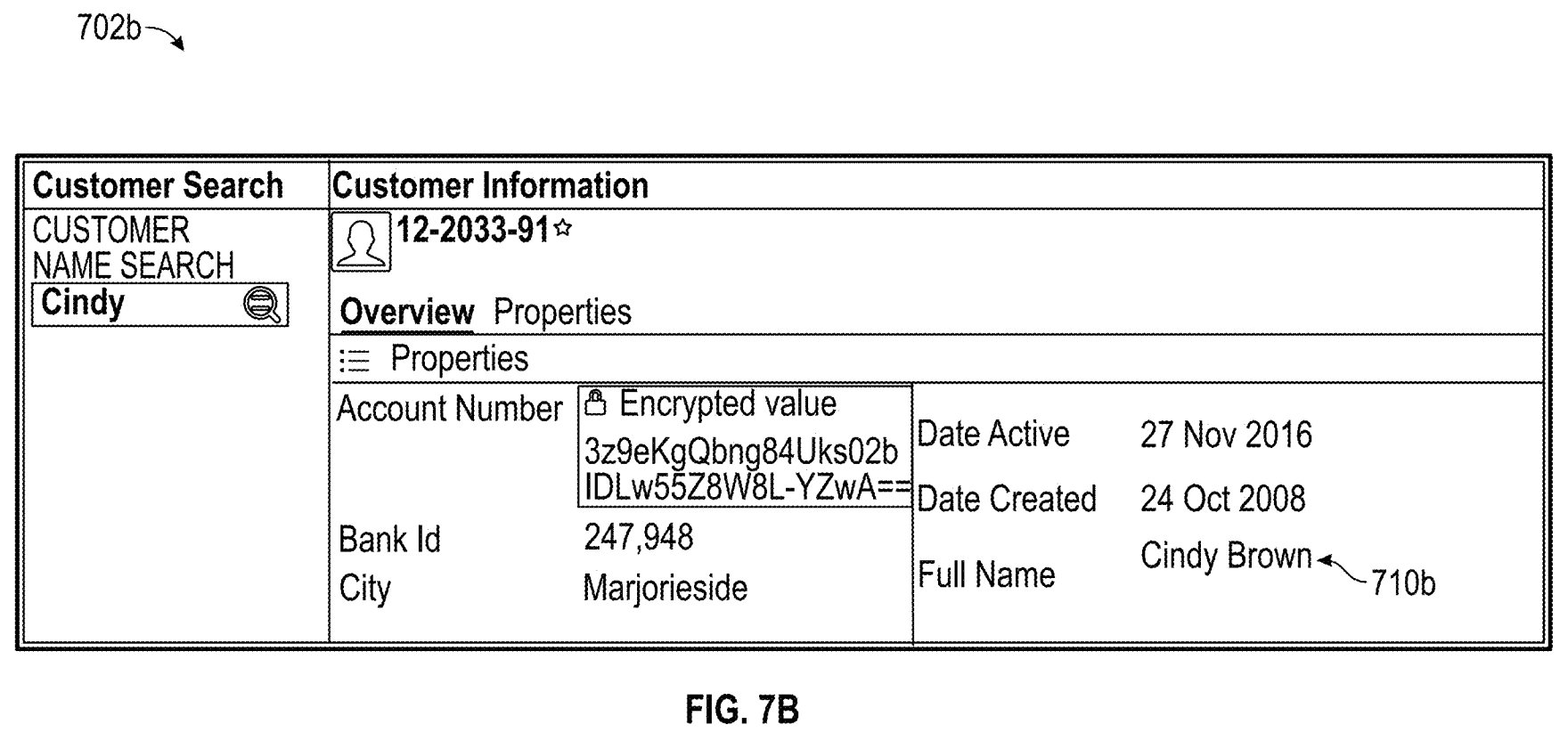

Customer Search

CUSTOMER NAME SEARCH

Cindy

Customer Information 12-2033-91

Overview Properties

Properties

| | | | |
|---|---|---|---|
| Account Number | Encrypted value<br>3z9eKgQbng84Uks02b<br>IDLw55Z8W8L-YZwA== | Date Active | 27 Nov 2016 |
| Bank Id | 247,948 | Date Created | 24 Oct 2008 |
| City | Marjorieside | Full Name | Cindy Brown |

USER-FRIENDLY, SECURE AND AUDITABLE CRYPTOGRAPHY ADMINISTRATION SYSTEM

TECHNICAL FIELD

The present disclosure relates to systems and techniques for cryptography. More specifically, the present disclosure relates to a cryptography administration system that may be configured to allow users to perform cryptographic operations in a secure and auditable manner and without the need for a technical understanding of, or access to, the keys or algorithms associated with the cryptographic operations. The cryptography administration system may further be configured to store cryptographic activities in an audit log that may be reviewed by a user.

BACKGROUND

Current cryptographic focused systems require users to have technical knowledge regarding a cryptosystem to apply hashing, encryption and decryption operations on data sets. Furthermore, users are required to develop the data transformation and security aspects of the cryptosystem which may be technically challenging.

Additionally, controlling access to the cryptosystem for various users can be challenging, particularly at a granular level. Sharing cryptographic keys to perform operations on the cryptosystem, such as decryption, can also be challenging and prone to human mistakes, especially across multiple systems. Finally, reviewing and auditing various operations, such as decryption, that have been performed by users of the cryptosystem is also difficult to implement in current cryptographic focused systems.

SUMMARY

Embodiments of the present disclosure relate to a cryptography administration system that may contain channels and licenses created by an administrator-user for perform user-friendly, secure and auditable cryptographic operations by an end-user.

A Cipher Channel may house a cryptosystem, including the cryptographic keys and algorithms, and may be built by a non-technical user using an intuitive user-interface. From within the user-interface, a user may select the data to encrypt in a Cipher Channel and may choose from among a plurality of various algorithms to apply to the Cipher Channel for encrypting and decrypting data. A user may further select and/or create Cipher Licenses, which may be customized (as discussed below), to apply to the Cipher Channel to secure access to the Cipher Channel.

In various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces that are useable and easily learned by humans is a non-trivial problem for software developers. The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

In one example embodiment, a computing system may be configured to provide a cryptography administration system. The computing system may comprise a computer readable storage medium having program instructions embodied therewith; and one or more processors configured to execute the program instructions which may cause the computing system to: display, via an interactive user interface, a raw data set including a plurality of raw data values; receive, via the interactive user interface, a user selection of one or more of the raw data values; receive, via the interactive user interface, a user selection of a cryptography algorithm; generate one or more cryptography keys; initiate generation of a channel associated with the selected one or more cryptography algorithms and the one or more cryptography keys, wherein the channel is accessible by a plurality of front-end applications to facilitate encryption and decryption operations; generate one or more encrypted data values by encrypting the one or more selected raw data values based, at least in part, on the cryptography algorithm associated with the channel; receive, via the interactive user interface, a user input of a third-party user; generate a license comprising one or more permissions of the third-party user to perform decryption operations on the encrypted data values via a front-end application that accesses the channel to initiate said decryption operations; and store the license as part of the channel.

In some embodiments, generating the license may further comprise display, via an interactive user interface, a plurality of permissions and a plurality of operations; receive, via the interactive user interface, selection of the one or more permissions of the third-party user; and receive, via the interactive user interface, selection of one or more of the plurality of operations permitted by the third-party user, wherein the license includes indications of the selected permissions and operations.

In some embodiments, the plurality of operations may comprise encrypting and decrypting data.

In some embodiments, the one or more processors may be further configured to execute the program instructions to cause the computing system to: display, via the interactive user interface, one or more cryptography algorithms selectable by the user, and wherein the one or more cryptography algorithms comprise one or more of a user-configured algorithm, a preconfigured algorithm, or a third-party configured algorithm.

In some embodiments, the cryptography key and the cryptography algorithm may be stored in one or more storage devices local to the cryptography administration system.

In some embodiments, the cryptography key and the cryptography algorithm may be stored in one or more storage devices remote to the cryptography administration system and generating the one or more encrypted data values may be done remotely from the cryptography administration system.

In some embodiments, the plurality of permissions may comprise one or more of encrypting and/or decrypting full data sets, encrypting and/or decrypting individual values, or a rate at which data may be encrypted and/or decrypted.

In some embodiments, the one or more processors may be further configured to execute the program instructions to cause the computing system to generate a plurality of licenses and wherein the channel further comprises the plurality of licenses.

In some embodiments, the one or more processors may be further configured to execute the program instructions to cause the computing system to receive, via the interactive user interface, input by a user of a justification prompt associated with the generated license.

In some embodiments, the justification prompt may comprise a prompt question and one or more justification options.

In one example embodiment, a method of decrypting data may comprise receiving, at a cryptography device from a requesting device, an encrypted value and metadata; identifying a user requesting decryption of the encrypted value; identifying a channel based on the metadata, wherein the channel includes one or more licenses associated with respective users and corresponding user permissions; determining a license associated with the user among the one or more licenses of the identified channel; determining one or more permissions of the user based on the determined license; in response to determining that the one or more permissions include a decryption permission, determining a cryptography key and cryptography algorithm associated with the channel; generating a decrypted value by decrypting the encrypted value using the cryptography key and the cryptography algorithm; and transmitting the decrypted value to the requesting device.

In some implementations, the one or more permissions may comprise one or more of encrypting and/or decrypting full data sets, encrypting and/or decrypting individual values, or a rate at which data may be encrypted and/or decrypted by the identified user.

In some implementations, the method may further comprise generating an audit log.

In some implementations, the audit log may comprise an indication of the identified user and a date and time of receiving the encrypted value.

In some implementations, the method may further comprise displaying a justification prompt, wherein the justification prompt may comprise a prompt question and one or more justification options, and receiving a user selection of a justification option.

In some implementations, the method may further comprise generating an audit log, wherein the audit log may comprise the received justification option, the indication of the identified user and a date and time of receiving the encrypted value.

In some implementations, determining the cryptography key and the cryptography algorithm associated with the channel may comprise retrieving the cryptography key and the cryptography algorithm from one or more storage devices local to the cryptography administration system.

In some implementations, determining the cryptography key and the cryptography algorithm associated with the channel may comprise retrieving the cryptography key and the cryptography algorithm from one or more storage devices remote to the cryptography administration system.

In some implementations, the identified user may not have direct access to the cryptography key or the cryptography algorithm.

In some implementations, generating the decrypted value may be done remotely from the cryptography device.

BRIEF DESCRIPTION OF THE DRAWINGS

FIG. 3B is a table illustrating an example of encrypted data.

FIGS. 7A-7B are example user interfaces usable to allow a user to perform cryptographic operations using the cryptography administration system.

DETAILED DESCRIPTION

Overview

Figure 1:
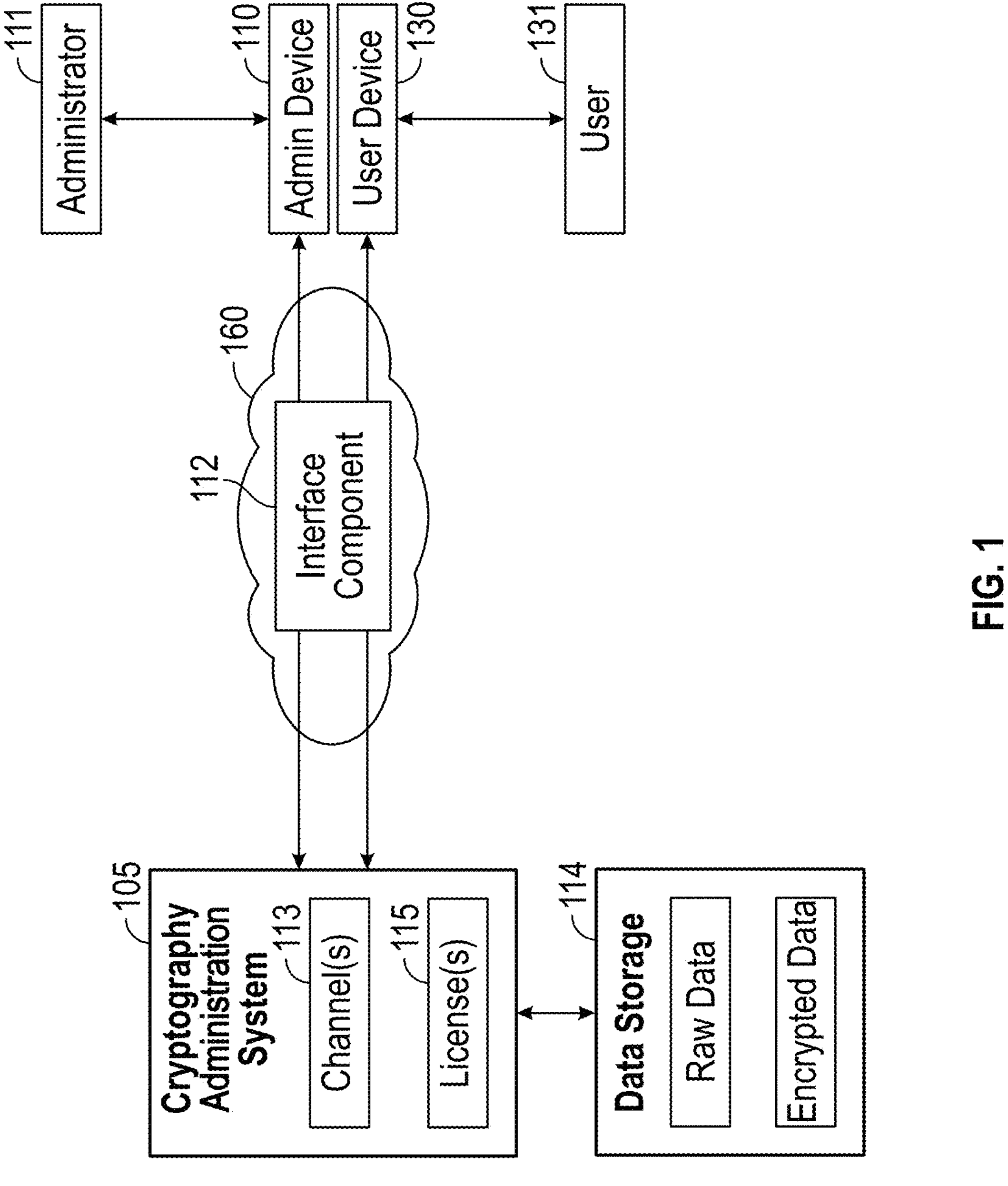
FIG. 1 is a block diagram illustrating an example cryptography administration system and devices that interact therewith.

Embodiments of the present disclosure relate to a cryptography administration system that may include channels and licenses created by an administrator that facilitate performance of user-friendly, secure and auditable cryptographic operations by a user.

In some embodiments, a system for user-friendly cryptography employs cryptographic channels and cryptographic licenses. A channel may house a cryptosystem, including the cryptographic keys and algorithms, and may be built by a non-technical user using an intuitive user-interface. From within the user-interface, a user may select the data to encrypt in a channel and may choose from among a plurality of various algorithms to apply to the channel for encrypting and decrypting data. A user may further select and/or create licenses, which may be customized (as discussed below), to apply to the channel to secure access to the channel.

Licenses may include various permission levels to restrict access to the channel (e.g., decryption features) in varying degrees. For example, a license may grant a user the right to decrypt and/or encrypt certain portions of data via the channel. A license may provide varying degrees of decryption rights to a user or group of users, for example decrypting and/or encrypting a portion of a dataset (e.g., an individual value, a row, a column, etc.) or rate-limited decryption, such as decrypting a limited number of values per day. Any number of licenses may be associated with a channel and separate licenses may be associated with different users, thus allowing for varying degrees of access to the channel depending on the user. Because the licenses are included in the channel, permissions to access the channel follow the encrypted data set of the channel which facilitates the secure sharing of data across systems.

A user does not need direct access to the cryptographic keys to perform operations (e.g., such as encryption or decryption) on data via the encryption algorithm associated with the channel. The cryptographic keys can be stored in a background storage service or an external storage service, and accessed through the use of licenses. Thus, access to the channel and performing operations thereon, such as decryption, can be restricted by the licenses while not requiring a user to have access (e.g., direct access) to the cryptographic keys of the cryptosystem.

Finally, the cryptography administration system is auditable. Actions, such as decryption, performed on a dataset via decryption by the channel, are tracked by logging activity with the requesting licenses. For example, when a user requests to decrypt data using a channel, information relating to the request to access the channel via the license can be recorded. This information may include date, time, user ID, operation requested, and/or any other related information. The recorded information can be included in an activity log that is reviewable by an auditor. The license can also indicate that justification prompts appear in a user interface when a user requests to access the channel and indicating justifications that are sufficient for the requested operation. The inputted justification can also be included in the activity log for review and audit.

The cryptography administration system as discussed herein may be used in a variety of circumstances with any type of data, such as military, law enforcement, healthcare, finance (e.g., banks or other financial institutions), supply chain, call centers and/or any other situations wherein it may be desirable to use cryptography to handle sensitive data.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Data Storage: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data storages. Accordingly, each database referred to herein (e.g., in the description herein and/or the figures of the present application) is to be understood as being stored in one or more data storages.

Cryptography Administration System (or simply a "System"): A system to facilitate user-friendly, secure and auditable cryptography. May include one or more of the numerous features discussed herein, such as channels, licenses and audit logs.

Cryptographic Channel (or simply "Channel"): A feature of the system that may be configured with one or more cryptographic keys and one or more cryptographic algorithms for performing cryptographic operations. A user may perform cryptographic operations using a channel according to the keys and algorithms with which it has been configured.

Key (also referred to herein as cryptographic key or channel key): Data that may be required to perform cryptographic operations such as encryption and decryption.

Algorithm (also referred to herein as cryptographic algorithm or channel algorithm): Data that may be used to perform cryptographic operations such as encryption and decryption.

Channel Identifier: Data that may identify a channel and may comprise the metadata to interact with a channel (e.g., point to the channel's location in storage) and its associated information. May be a relative identifier (RID) and may be included as a portion of an encrypted data value.

Encrypted Data Values: Individual encrypted data items, where a data item may be any size or type of data, such as a single character, a word, a section, a cell, a row, a column, etc. Encrypted data values may be associated with channel identifiers.

Encrypted Data: Raw data that has been obfuscated by a cryptographic operation. Encrypted data may include one or more encrypted data values.

Raw Data Values: Individual raw data items, where a data item may be any size or type of data, such as a single character, a word, a section, a cell, a row, a column, etc. Examples may include a name or an account number.

Raw Data: Data that may comprise sensitive information such as personal identification information (PII). Raw data may include one or more raw data values.

Operations (also referred to herein as cryptographic operations): Operations such as encryption and decryption that may be performed on data by a user using the cryptography administration system described herein.

Permissions: Rights specified in a license and granted to a user with access to the license, which may allow the user to perform cryptographic operations according to those rights. Example permissions include single-value operations and bulk operations.

Cryptographic License (or simply "License"): A feature of the system that may be associated with (e.g., included in) a channel. A license may be user-specific or may be associated with multiple users and/or groups of users such that users may have access to the license. A license may be shared with other users so that the users with whom a license is shared have access to the license. A user that is associated with (e.g., has access to) a license, as well as appropriate permissions within the license, may perform cryptographic operations with channel(s) associated with that license. A user must have access to a license to perform cryptographic operations using the cryptography administration system described herein. Licenses may specify permissions of an authenticated user to perform cryptographic operations.

Administrator: An individual, group of individuals, or entity that may use the cryptography administration system to create channels and licenses. An administrator may also be a user.

User: An individual, group of individuals, or entity that may use the cryptography administration system to perform cryptographic operations according to the channel(s) and license(s) created by the administrator. The user may use the cryptography administration system via various front-end applications that display data to the user. For example, the cryptography administration system may be configured for multi-tenancy user, such as to provide access to channels and licenses from multiple user devices and software applications. A user may also be an administrator.

Audit log: Data indicating activities that are performed by users via the cryptography administration system, such as a chronological history of decryption and encryption operations performed on data items. For example, audit data may be saved to an audit log upon use of a license to perform an operation. An audit log may be displayed via an interface to allow a user and/or administrator to review a history of cryptographic operations. An audit log can be stored to a data store such as data storage 114 described herein, and audit data can be indexed for efficient search, retrieval and review workflows.

Justification Prompts: A user interface displayed to a user when the user attempts to perform a cryptographic operation. A license may indicate that a justification prompt should be provided to the user, and may indicate acceptable justifications for use of the particular license. A justification prompt may include a prompt question and one or more justification options. The user may enter a justification for the requested operation. The cryptography administration system may limit performance of the operation based on the users entered justification. Entered justifications may be saved to the audit log.

Example System Overview

FIG. 1 is a block diagram illustrating an example implementation of a cryptography administration system 105 and various devices that may interact therewith. In this example, the example cryptography administration system 105 comprises one or more cryptographic channel(s) 113 and one or more cryptographic license(s) 115. As discussed in further detail below, the channel(s) 113 may be used to perform cryptographic operations by users according to permissions of their associated license(s) 115.

The cryptography administration system 105 may be in communication with devices, such as an administrator (or "admin") device 110 and a user device 130, such as via a network 160 comprising any combination of wired and wireless communication networks, such as one or more LANs, WANs, and/or the Internet. An administrator 111 and/or user 131 may interact with the cryptography administration system 105 via the devices 110, 130, respectively. An interface component 112 may be configured to generate interactive user interfaces for display on the admin device 110 and/or user device 130. For example, the interface component 112 may comprise a front-end application (e.g., standalone or browser based) that is executed on the admin and/or user devices to allow the administrator and/or user to interact with the cryptography administration system 105.

In some implementations, admin device 110 and user device 130 may be the same device. In some implementations, administrator 111 and user 131 may be the same individual, group of individuals, or entity. In some implementations, any number of devices 110, 130 may exist and any number of administrators 111 and users 131 may exist.

As discussed in more detail below, the user interfaces are advantageously interacted with by an administrator 111 to update information regarding the cryptography administration system 105, such as creating channels and licenses. A user 131 may interact with the cryptography administration system 105 via various front-end applications that are configured to communicate via the interface component 112 with the cryptography administration system 105 to perform cryptographic operations such as encrypting and decrypting data, as discussed further below.

The cryptography administration system 105 may be in communication with a data storage 114. The data storage 114 may be configured to store elements of the cryptography administration system 105 such as channels along with their associated cryptographic key(s), cryptographic algorithm(s), license(s), and/or other related information such as encrypted data, and/or raw data. In some embodiments, the data storage 114 comprises one or more storage devices local to the cryptography administration system 105, while in others the data storage 114 is located external and/or remote to the cryptography administration system 105, for example in the cloud, an external storage service or a third-party database.

Figure 2:
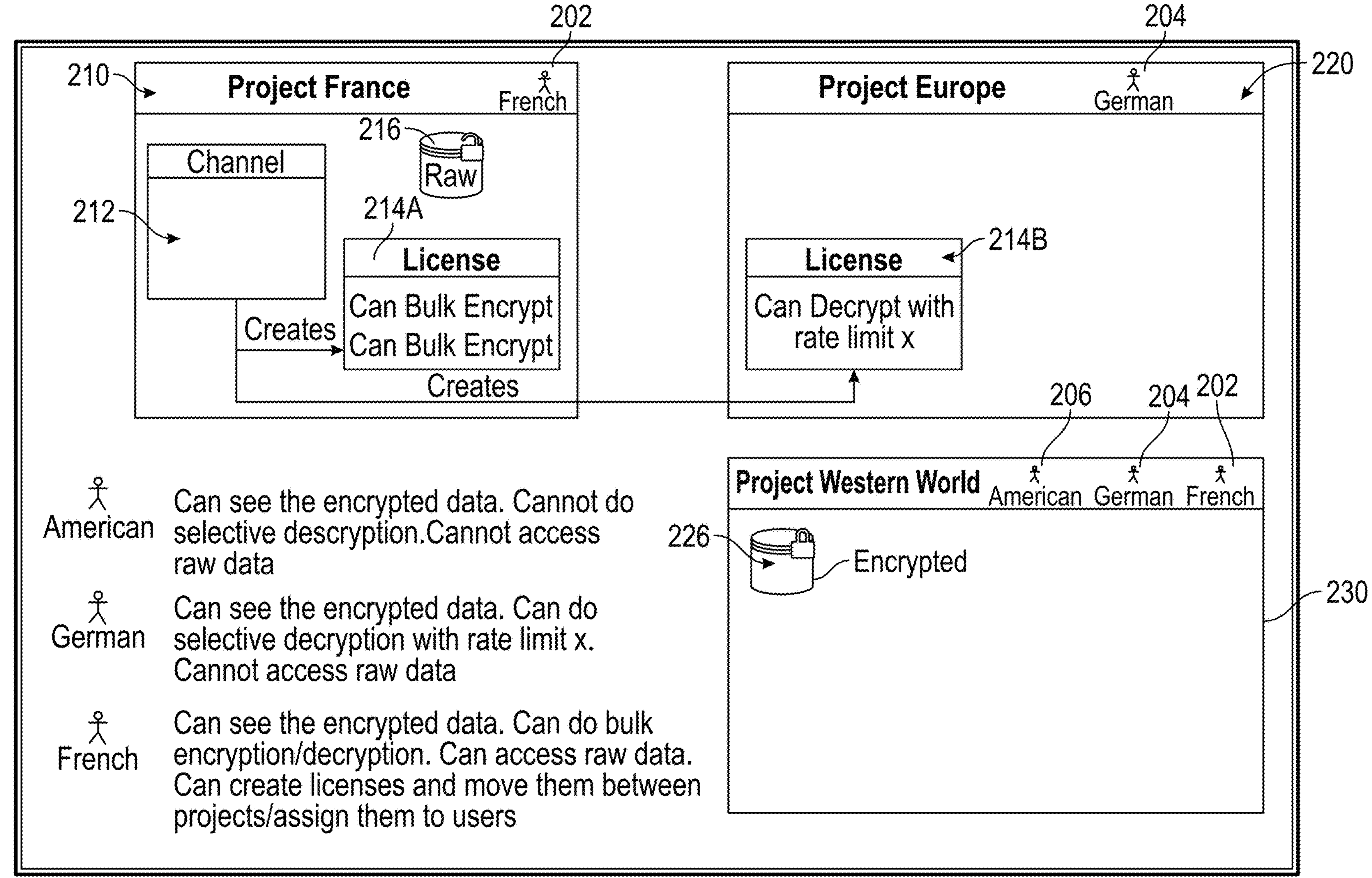
FIG. 2 is a block diagram illustrating an example application of the cryptography administration system.

FIG. 2 is a conceptual block diagram illustrating an example application of the cryptography administration system 105 described herein. The example shown in FIG. 2 is given to illustrate use of the cryptography administration system 105 and is not meant to be limiting. In this example, a French user 202 is an administrator (e.g., administrator 111 show in FIG. 1). In this example, French user 202 has raw data 216 stored as part of Project France 210. The French user 202 may wish to share limited access to the raw data 216 with other users, such as a German user 204 and/or an American user 206, which may correspond to users 131 shown in FIG. 1. The French user 202 communicates with the cryptography administration system to create a channel 212 and select and/or create an associated cryptographic algorithm to be used when encrypting or decrypting data using the channel 212. The channel 212 may then be used to encrypt the raw data 216 to generate encrypted data 226. In this example, the French user 202 has moved or copied the encrypted data 226 to a location, such as represented by Project Western World 230 in FIG. 2, where authorized users outside of Project France 210 may access and selectively decrypt the encrypted data.

In this example, the French user 202 (e.g., the administrator) may grant limited access to the encrypted data 226 to one or more other entities, such as the American user 206 and/or the German user 204, through creation of licenses for other users. For example, the French user 202 (e.g., the administrator) may create license 214A and 214B. License 214A is associated with French user 202, and indicates bulk encrypt and bulk decrypt authorizations, while license 214B is associated with the German user 204 and indicates that decryption with a particular rate limit may be performed by the authenticated German user 204. In this example, the American user 206 does not have access to any license and thus does not have the necessary rights to perform operations on the encrypted data 226 such as decryption to view the raw data 216.

Figure 3A:
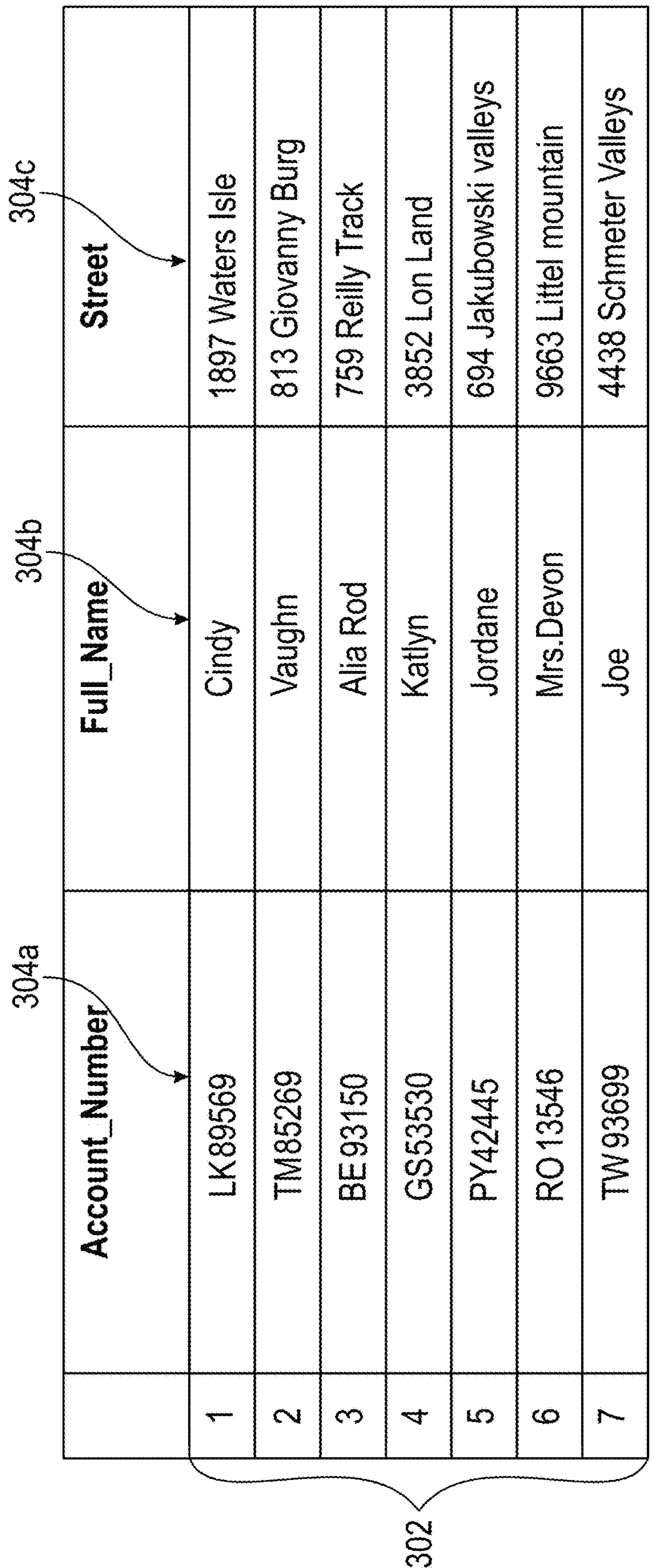
FIG. 3A is a table illustrating an example of raw data.

FIG. 3A is a table illustrating an example of raw data 302, such as data that may be used in various practical applications, such as a customer data stored by an entity, such as a financial, manufacturing, service, or other entity type. The raw data 302 may comprise raw data values such as raw data values 304*a*, 304*b*, 304*c*. As shown in FIG. 2, the raw data values may include multiple rows of information, such as account number (304*a*), name (304*b*), street address (304*c*), for each of multiple user accounts. The raw data 302 may be stored in a data storage 114 with which the cryptography administration system 105 may communicate as shown in FIG. 1.

FIG. 3B is a table illustrating an example of encrypted data 312, such as encrypted data that may be generated by encrypting the data 302 of FIG. 3A using a cryptographic channel created by an administrator. The encrypted data 312 may comprise encrypted data values such as encrypted data values 314*a*, 314*b*, 314*c*. In this example, encrypted data values 314*a*, 314*b*, 314*c* may be encrypted values of corresponding raw data values 304*a*, 304*b*, 304*c*, respectively.

In some implementations, the same raw data 302 may be encrypted more than once by the cryptography administration system 105, for example according to different channels 113, by the same or different administrators 111 and/or users 131. In situations where the same raw data 302 has been encrypted more than once (e.g., according to different channels 113), more than one encrypted data value may be included in the table of FIG. 3B for each raw data value. For example, two rows of encrypted data values 314*a*, 314*b*, 314*c* may be included for each row of raw data, one row for each of the two different channels.

The encrypted data 312 may have been encrypted according to channel(s) 113 of the cryptography administration system 105 as will be described in greater detail herein. The encrypted data 312 may be stored in a data storage 114 with which the cryptography administration system 105 may communicate as shown in FIG. 1.

The encrypted data values (e.g., 314*a*, 314*b*, 314*c*) may each include a channel identifier portion 320 and an encrypted data portion 322. The channel identifier indicated in portion 320 may be a pointer to a storage location where the corresponding cryptographic channel is stored and/or accessible. As discussed in greater detail herein, encrypted data values that have been encrypted according to the same channel 113 may each comprise the same channel identifier, as shown in the example of FIG. 3B in the channel identifier portion 320 of the multiple rows of encrypted data 312. The channel identifier may be used to identify and access a channel and its associated information, such as channel key(s) and channel algorithm(s). Advantageously, the channel identifier provides metadata included in the encrypted data values (e.g., 314*a*, 314*b*, 314*c*) for how to perform cryptographic operations, such as decryption, on the encrypted data value such that an administrator 111 and/or user 131 is not required to have direct access to cryptographic key(s) and/or algorithm(s) to perform cryptographic operations. Because of the metadata (e.g., channel identifier), the information necessary to perform cryptography on encrypted data values (e.g., 314*a*, 314*b*, 314*c*) can be included in or with the encrypted data values external to the cryptography administration system 105 (e.g., at the user device 130) while still remaining secure.

In some implementations, the encrypted data portion 322 may comprise the actual full encrypted value corresponding to a raw data value. In some implementations, the encrypted data portion 322 may comprise a pointer to a storage location where the full encrypted value is stored and/or accessible.

As shown in FIG. 3B, each account number raw data value in the left column (e.g., 314*a*) has been encrypted using the same channel as shown by each encrypted data value in that column including the same channel identifier. This is shown as an example and the raw data values may be encrypted according to any channel 113 based on an administrator and/or user selection of which raw data to encrypt according to which channel 113. For example, a user may encrypt each raw data value of the same column according to the same channel or according to a unique channel 113.

Example Channel Creation

Figure 4A:
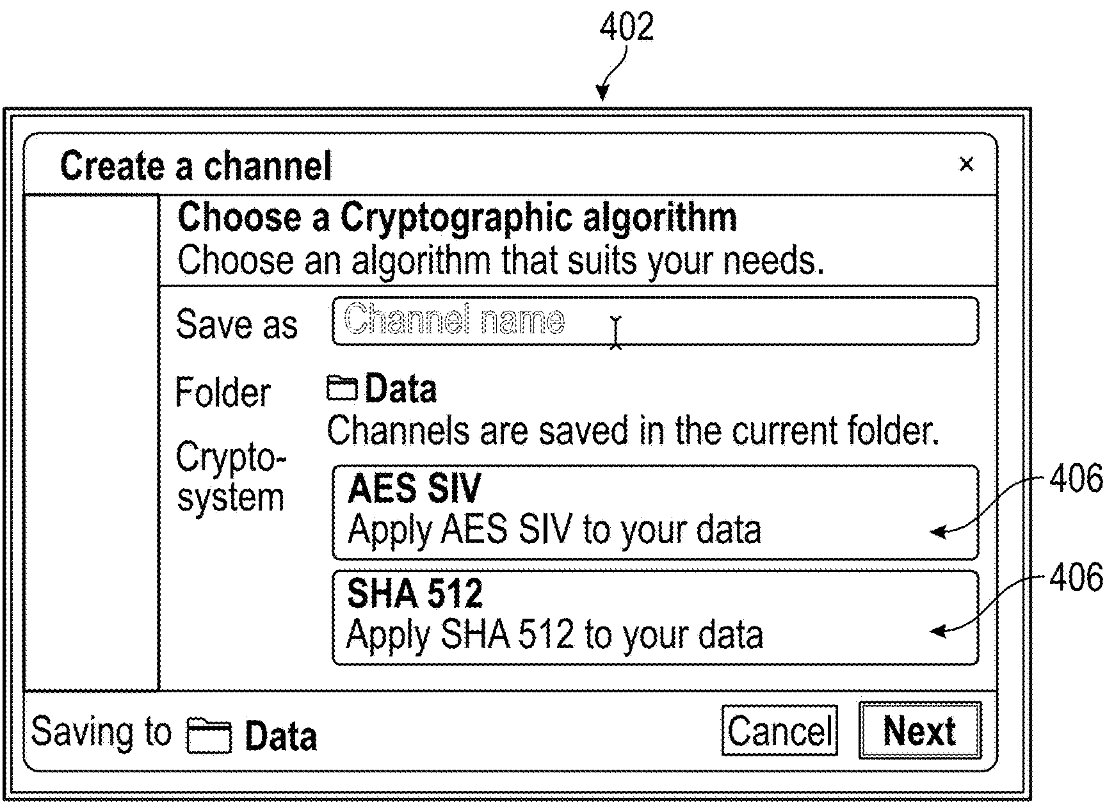
FIGS. 4A-4B are example user interfaces usable to create channels in the cryptography administration system.
Figure 4B:
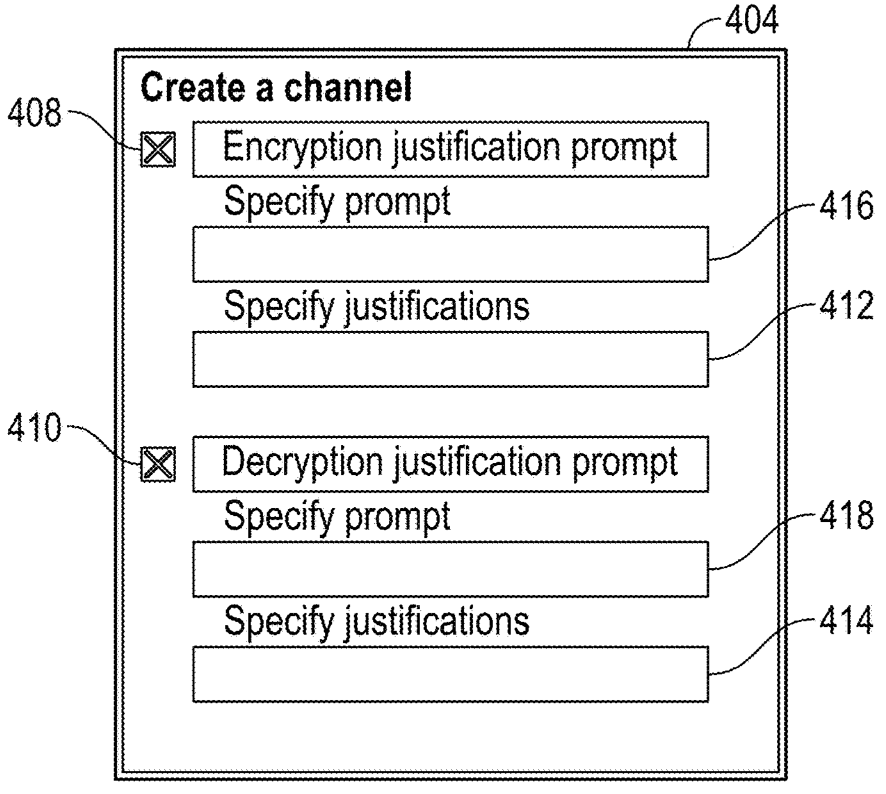

As shown in FIG. 1, the interface component 112 may generate and display user interfaces, via an admin device 110, to an administrator 111. The administrator 111 may input information, via the user interfaces, to update information relating to the cryptography administration system 105. FIGS. 4A-4B are example user interfaces 402, 404 usable to create channels 113 in the cryptography administration system 105. User interfaces 402, 404 may be generated by the administrator 111 interfacing with the interface component 112. Advantageously, an administrator 111 may create channel(s) 113 via the user interfaces 402, 404 without a technical understanding of cryptography or of the cryptography details of the cryptography administration system 105.

As shown in FIG. 4A, user interface 402 may display one or more algorithms 406 such as AES SIV and/or SHA 512. In some implementations, the user interface 402 may display more algorithms than those shown, such as any publicly available or proprietary algorithm for encrypting and/or decrypting data. In some implementations, the user interface 402 may allow an administrator 111 to implement an algorithm not displayed in the user interface 402. In some implementations, the user interface 402 may display algorithms that have been previously configured by a user 131, administrator 111 or other third party.

The administrator 111 may enter additional information via the user interface 402 such as the channel name and a location, such as a network location of a particular folder, to save the channel. Upon channel creation, the cryptography administration system 105 may generate one or more keys to associate with the channel and to be used for performing cryptographic operations using the channel. In some embodiments, an administrator may input (e.g., via the interface 402) one or more keys to associate with the channel and to be used for performing cryptographic operations using the channel. A channel that has been created, for example by an administrator 111 via the interface 402, may be stored in the data storage 114 along with its associated information, such as the selected algorithm(s) and/or key(s) and/or pointers to the selected algorithm(s) and/or keys(s). A channel that has been created, may be used to encrypt and/or decrypt data according to the algorithm(s) selected by the administrator 111.

FIG. 4B illustrates an additional optional user interface 404 for creating channels. Upon creating the channel, the administrator 111 may select whether a particular justification for encrypting and/or decrypting data must be supplied by the requesting users. Additionally, the administrator may indicate a particular justification prompt to be displayed when a user 131 attempts to perform certain operations with the channel, as well as justifications that are acceptable to allow the operations.

In the example of FIG. 4B, the administrator 111 may select an encryption button 408 and/or a decryption button 410 via the user interface 404 to indicate whether a justification prompt appears when a user 131 attempts to encrypt or decrypt data, respectively. In the example user interface 404, the administrator 111 has selected that a justification prompt will appear when a user 131 attempts to encrypt data and also when a user 131 attempts to decrypt data. In some embodiments, one or more aspects of the user interface 404 may additionally and/or alternatively be included in user interface 602 of FIG. 6, discussed below.

The cryptography administration system 105 may automatically add a pre-defined (e.g., a default) prompt to the channel, which may be displayed in encryption prompt field 416. Example pre-defined prompt questions may include "why are you decrypting?" The administrator 111 may be able to add additional or alternative prompt questions to the encryption or decryption prompts, respectively, via input dialogue boxes 416, 418.

The cryptography administration system 105 may automatically add a pre-defined (e.g., default) list of justification options that are selectable with reference to the prompt. Example pre-defined justification options may include "response to customer inquiry." The administrator 111 may be able to add additional justification options to the encryption or decryption prompts, respectively, via input dialogue boxes 412, 414. The administrator may further be provided with an option to indicate which of multiple available justifications are sufficient to allow the requested encryption or decryption operation, and may indicate limited encryption and/or decryption rights for respective justifications.

Example License Creation

An administrator 111 may create one or more licenses to be associated with created channels. Licenses include permissions for particular users 131 to perform operations using the associated channel such as encryption and/or decryption. Licenses, and their associated information (e.g., permissions), may be stored in the data storage 114. Advantageously, the permissions to perform operations using a channel are thus associated with the channel because of the license(s) associated with the channel.

Figure 5:
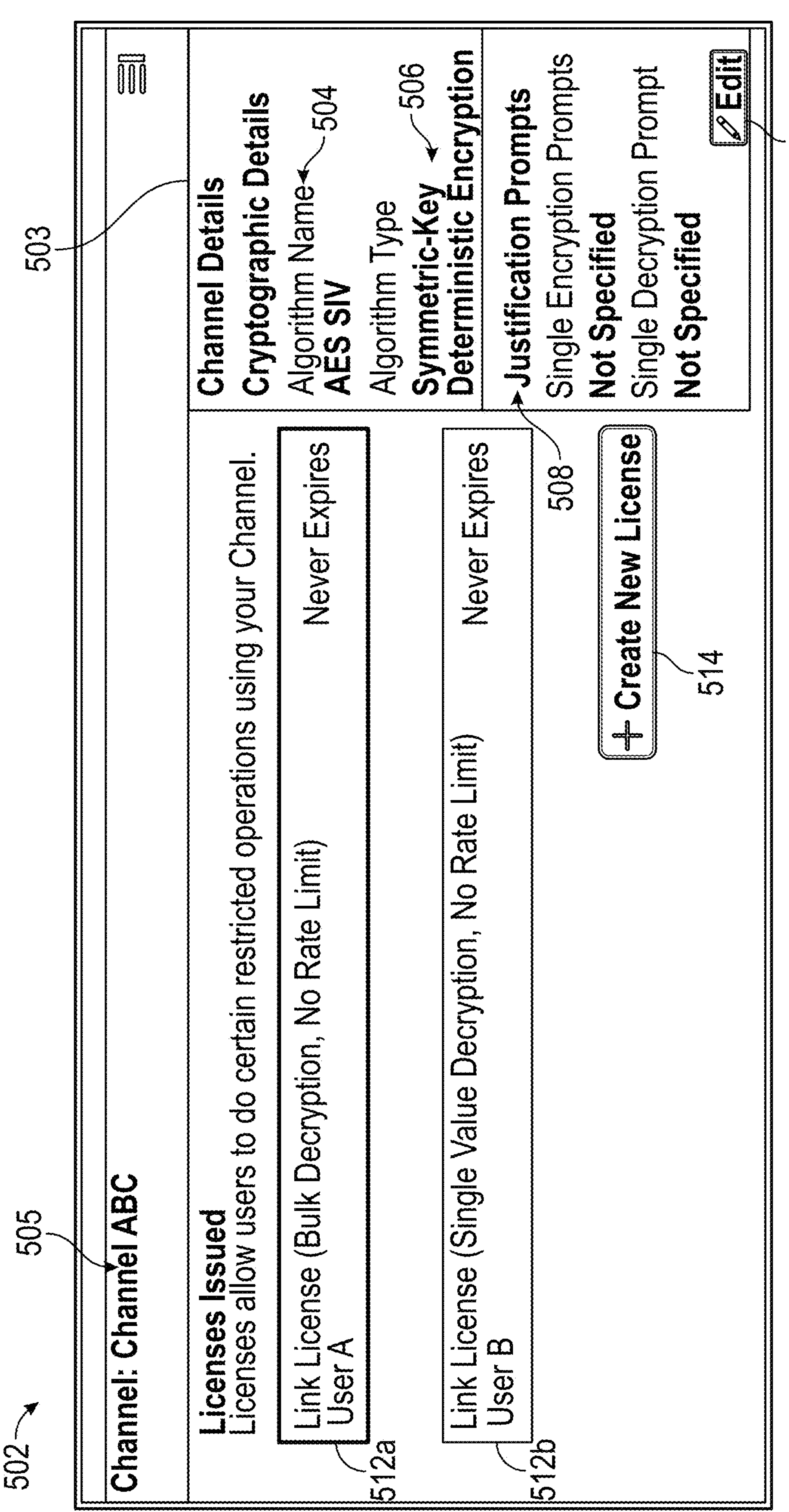
FIG. 5 is an example user interface usable to allow an administrator to create licenses in the cryptography administration system.

FIG. 5 is an example user interface 502 usable to allow an administrator to create licenses using the cryptography administration system 105. The interface component 112 may generate user interface 502 to display, via an admin device 110, to an administrator 111. The administrator 111 may input information, via the user interface 502 to update information relating to the cryptography administration system 105. In this example, a channel 505 (e.g., "Channel ABC") has been selected by the user, and so the system displays licenses 512 that have been created and are associated with the channel 505. As shown, license **512*a* is associated with user A and provides certain access rights to user A, while license 512*b*** is associated with user B and provides certain different access rights to user B.

In this example, the user has selected license **512*a*, so the user interface 502 displays license details, such as associated channel information 503, which may indicate the algorithm 504 and algorithm type 506 of channel 505, as well as any associated justification prompt information 508. An administrator 111 may edit the algorithm 504, algorithm type 506 and/or the justification prompts 508 by selecting an edit button 510, which may navigate the administrator 111 to user interfaces 402 and/or 404 shown in FIGS. 4A-4B or similar interfaces to allow the administrator 111 to edit information relating to algorithm and/or justification prompts of the channel 505**.

Figure 6:
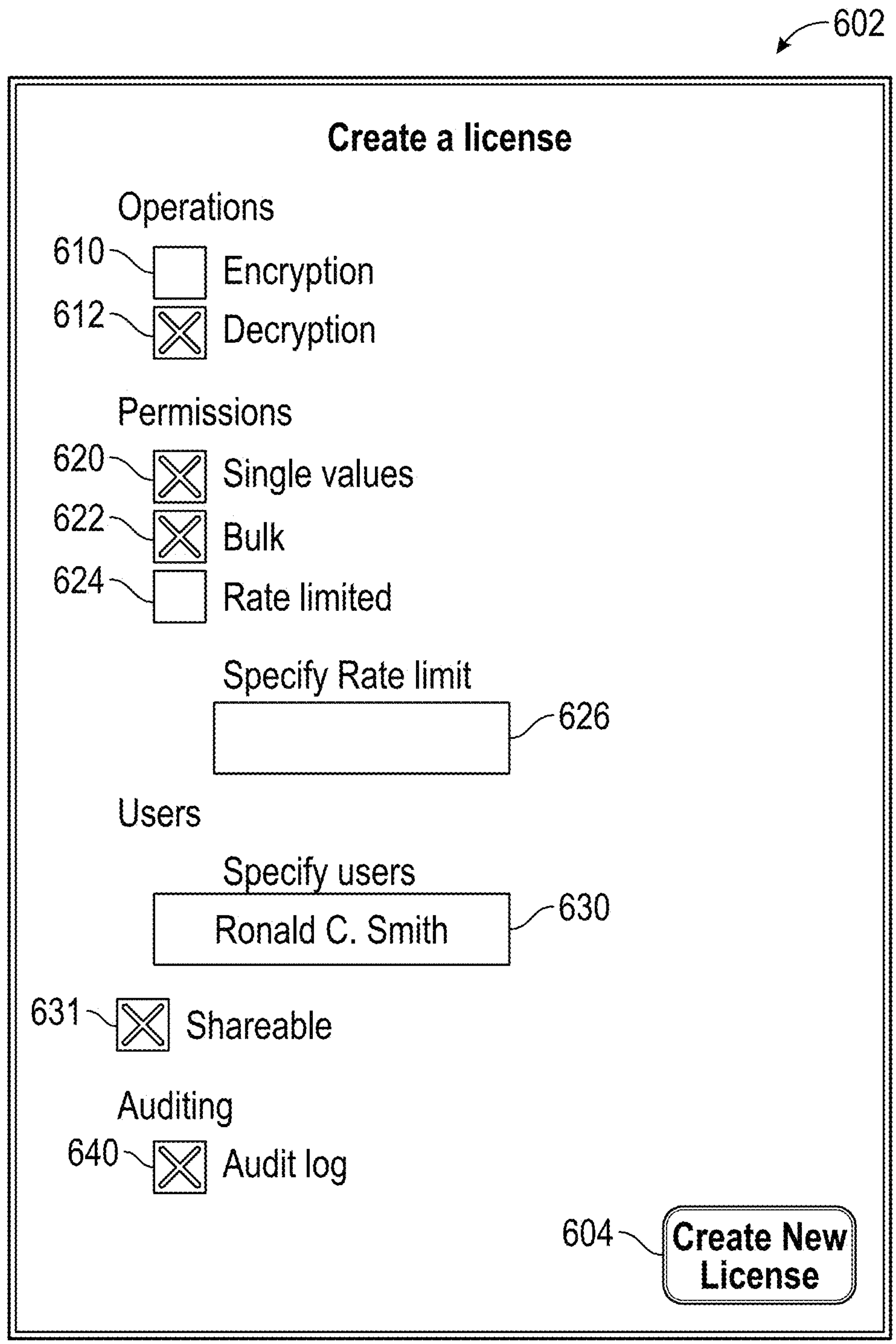
FIG. 6 is an example user interface usable to allow an administrator to specify the details of a license when creating the license.

An administrator 111 may create licenses to associate with a channel, such as by selecting a create new license button 514, which may navigate the administrator 111 to user interface 602 shown in FIG. 6 or a similar interface to allow the administrator 111 to enter information relating to the license to be created.

FIG. 6 is an example user interface 602 usable to allow an administrator to specify the details of a license when creating the license or to modify an existing license. As noted above, a license may include information relating to how a channel may be used. For example, a license may specify operations that may be performed with the channel, such as particular portions of data that may be decrypted (or encrypted) or limits to the amount of data that may be decrypted (or encrypted). A license may specify permissions required by a user to perform a particular operation. For example, a license may include a permission for a user 131 to perform single value encryption and/or decryption, a permission to perform bulk encryption and/or decryption (e.g., on more than one value such as a full column of data values), and/or a permission for a user 131 to perform rate limited encryption and/or decryption. A rate limited permission to perform operations with the channel may allow a user 131 to perform a limited number of operations within a given time frame. A license may also include information identifying the users with access to the license. A user with access to the license may perform the operations specified in the license at the permission level specified in the license.

The interface component 112 may generate user interface 602 to display, via admin device 110, to an administrator 111. The administrator 111 may input information, via the user interface 602 to update information relating to the cryptography administration system 105. User interface 602 may display selectable encryption and decryption components 610 and 612. An administrator 111 may select one or both or none of the selectable components 610, 612 to specify the operations that a user 131 with access to the license may perform with the channel. For example, an administrator 111 may select selectable component 610 to provide permission to a user 131 to perform encryption using the channel. An administrator 111 may select selectable component 612 to provide permission to a user 131 to perform decryption using the channel. In the example shown in FIG. 6, an administrator 111 has selected selectable component 612, but not selectable component 610, thus allowing a user with access to the license to perform decryption but not encryption using the channel.

User interface 602 may display selectable permission components 620, 622, and 624. An administrator 111 may select some or all or none of the selectable permission components 620, 622, 624 to indicate particular permissions associated with the license. For example, an administrator 111 may select selectable component 620 to grant a user 131 permission to perform operations (e.g., encryption, decryption) on single values of data using the channel. An administrator 111 may select selectable component 622 to grant a user 131 permission to perform operations (e.g., encryption, decryption) using the channel on one or more values of data, such as full column sets of data, simultaneously. An administrator 111 may select selectable component 624 to grant a user 131 permission to perform operations (e.g., encryption, decryption) within a certain rate (e.g., number of operations within a time frame) such as a certain number of operations per day. The rate limit may allow for a particular number of operations during a specified length of time. For example, the rate may be up to 10, 100, 1000 or more operations, or any number of operations that is appropriate or desired, within an hour, a day, a week, a month, a year or any time frame that is appropriate or desired. An administrator 111 may enter a rate limit into input dialogue box 626. In some implementations, an administrator 111 may enter a rate limit, via a drop-down list or other similar interface means via the user interface 602. In the example shown in FIG. 6, an administrator 111 has selected selectable components 620 and 622, but not selectable component 624, thus allowing a user 131 with access to the license to perform operations using the channel associated with that license on single data values or bulk sets of data, such as full columns, without a rate limit.

In some implementations, user interface 602 may allow a user, such as an administrator 111, to select users to have access to the license to be created. Any number of users may have access to a license. In the example of FIG. 6, a user input box 630 is provided to allow an administrator 111 to indicate one or more user(s) to be associated with the new license. In some implementations, an administrator 111 may select user(s) to have access to the license via a drop-down list or other similar interface means via the user interface 602.

In the example of FIG. 6, user interface 602 allows a user, such as an administrator 111, to select whether the license may be shared with additional users 131 after it has been created. For example, an administrator 111 may select the shareable component 631 to indicate that the license may be shared after it has been created. In some implementations, selecting the shareable component 631 may allow anyone with access to the license, such as an administrator 111 or user 131, to share the license with others after it has been created. In some implementations, selecting the shareable component 631 allows only the administrator 111 to share the license with others after it has been created and/or allows sharing of the license with certain restrictions, such as other users within a particular user group. In the example shown in FIG. 6, an administrator 111 has selected shareable component 631 to indicate that the license may be shared with additional users 131 after it has been created.

In some implementations, the cryptography administration system 105 may track operations performed using a channel (e.g., operations such as encrypting and decrypting) and/or other activities associated with a channel. The operations and/or activities may be saved in an audit log and/or data store along with information relating to the operation and/or activity, such as date, time, type of operation/activity, user-inputted justification, user, and/or user location. Information may be logged to the audit log when the license is used, as discussed further below. The audit log may be saved in the data storage 114 and/or other location. The user interface 602 may display a selectable auditing component 640. An administrator 111 may select the auditing component 640 to indicate that an audit log is to be generated for operations/activities performed with the channel. In the example shown in FIG. 6, an administrator 111 has selected auditing component 640 thus causing the cryptography administration system 105 to generate and maintain an audit log of operations/activities of the channel.

Once the license information has been provided, an administrator 111 may create a license by selecting the create new license component 604. The license will be created according to the selectable components that have been selected by the administrator 111 as discussed above. In the example user interface 602 shown in FIG. 6, an administrator 111 has selected the selectable components 612, 620, 622, 631, 640 that are displayed in the interface. A license created according to the selections shown in example user interface 602 shown in FIG. 6 would allow the specified user(s), e.g., Ronald C. Smith in the example of FIG. 6, to use the license to decrypt, with the channel, single data values or bulk sets of data without a rate limit and the cryptography administration system 105 would track operations/activities in an audit log associated with the channel. In this example, the created license would also be shareable with other users.

User interface 602 is shown as an example and is not meant to be limiting. In some implementations, user interface 602 displays more than what is shown in FIG. 6. For example, in some implementations user interface 602 may display any of the aspects shown in user interface 404 of FIG. 4B. In some implementations, user interface 602 displays less than what is shown in FIG. 6. For example, user interface 602 may not display user input box 630 for specifying users, shareable component 631 for selecting whether the license may be shared and/or auditing component 640 for activating tracking of operations/activity associated with the license in an audit log.

Example Process of Decrypting Data in the Cryptography Administration System

A user 131 may wish to perform cryptographic operations on data using the cryptography administration system 105. For example, a user 131 may wish to decrypt data using the cryptography administration system 105. As discussed herein, the cryptography administration system 105 may be useful for performing cryptography in many contexts such as securing sensitive data of individuals held by companies and other institutions. For example, a financial institution, such as a bank, may use the cryptography administration system 105 to secure the sensitive data of their customers such as account numbers, addresses, and names of their customers. As discussed with respect to FIGS. 7A-7B, an employee of a financial institution may be a user 131 who uses the cryptography administration system 105 to decrypt and view a customer's sensitive personal information. This may be useful, for example, when the financial institution customer calls the employee (e.g., user 131) to request information relating to the customer's account with the financial institution.

Figure 7A:
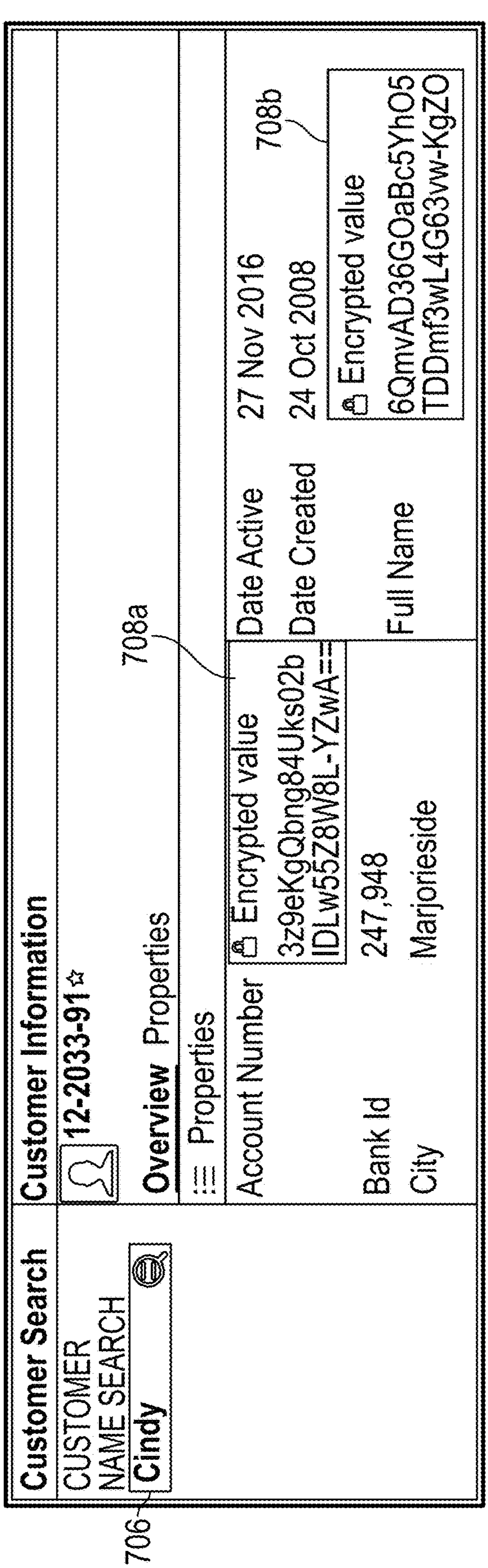

FIGS. 7A-7B are example user interfaces **702*a*, 702*b* usable to allow a user 131 to perform cryptographic operations using the cryptography administration system 105. In some implementations, the interface component 112 may generate user interfaces 702***a*, 702*b*. A user 131 may visualize the interfaces 702*a*, 702*b* via a user device 130 and may interact with the user interfaces 702*a*, 702*b* to perform cryptographic operations (e.g., encryption, decryption) using the cryptography administration system 105.

User interfaces 702*a*, 702*b* are given as examples and are not meant to be limiting of the present disclosure. The interface component 112 may generate a variety of interfaces according to a variety of front-end software applications to display to a user 131 via user device 130. Additionally, a software application of the user (e.g., customer management software) may generate similar user interfaces, with data populated through communications with the cryptography administration system via the interface component 112. Various front-end applications may access the cryptography administration system either via the interface component 112 or directly. For example, an API for communicating with the cryptography administration system may be provided to various entities so the front-end software used by those entities may communicate with the cryptography administration system directly via the API, such as to request decryption of encrypted data and to receive the decrypted data.

In the example of FIG. 7A, user interface 702*a* displays an encrypted account number 708*a* and an encrypted full name 708*b*, such as for a particular customer record that was identified responsive to search query 706 provided by the user 131, which will be discussed in greater detail with reference to FIG. 9. The user interface 702*a* may display the entirety of an encrypted data value or portions thereof, such as the channel identifier (320 of FIG. 3B) or other portions as shown in the example user interface 702*a*.

A user 131 may wish to decrypt the encrypted full name data 708*b* to view the full name of the customer record. The user 131 may select, via the user interface 702*a*, the encrypted data 708*b*, which may initiate a request to the cryptography administration system 105 to decrypt the encrypted data 708*b*. Upon receiving the request to decrypt the encrypted full name value 708*b* from the user 131 via the user interface 702*a*, the cryptography administration system 105 may verify the user 131 has authority to perform the requested operation by verifying the user 131 has access to a license associated with the channel that has been associated with the encrypted data 708*b*. In addition to having access to a license associated with the encrypted data, the cryptography administration system 105 determines whether the license grants the user 131 the necessary permissions to perform the requested operation. If the user 131 has authority to perform the operation, the cryptography administration system 105 may decrypt the encrypted data, by using the channel associated with the data, to obtain the raw data. The cryptography administration system 105 may then return the raw data, such as one or more raw data values to the user 131. The user interface may display the raw data values to the user 131. Example user interface 702*b* displays raw data value 710*b*, which is the full name that is encrypted in the encrypted data 708*b*.

Advantageously, the cryptography administration system 105 may allow a user 131 to perform cryptographic operations, such as encryption and decryption, without a technical understanding of cryptography and without access to the cryptographic key(s) and/or algorithm(s) for performing the operation. This may be due, at least in part, to the use of channels within the cryptography administration system 105. Furthermore, cryptographic operations, such as encryption and decryption, are still secure within the cryptography administration system 105 by use of licenses which restrict cryptographic operations to authenticated users.

Figure 8:
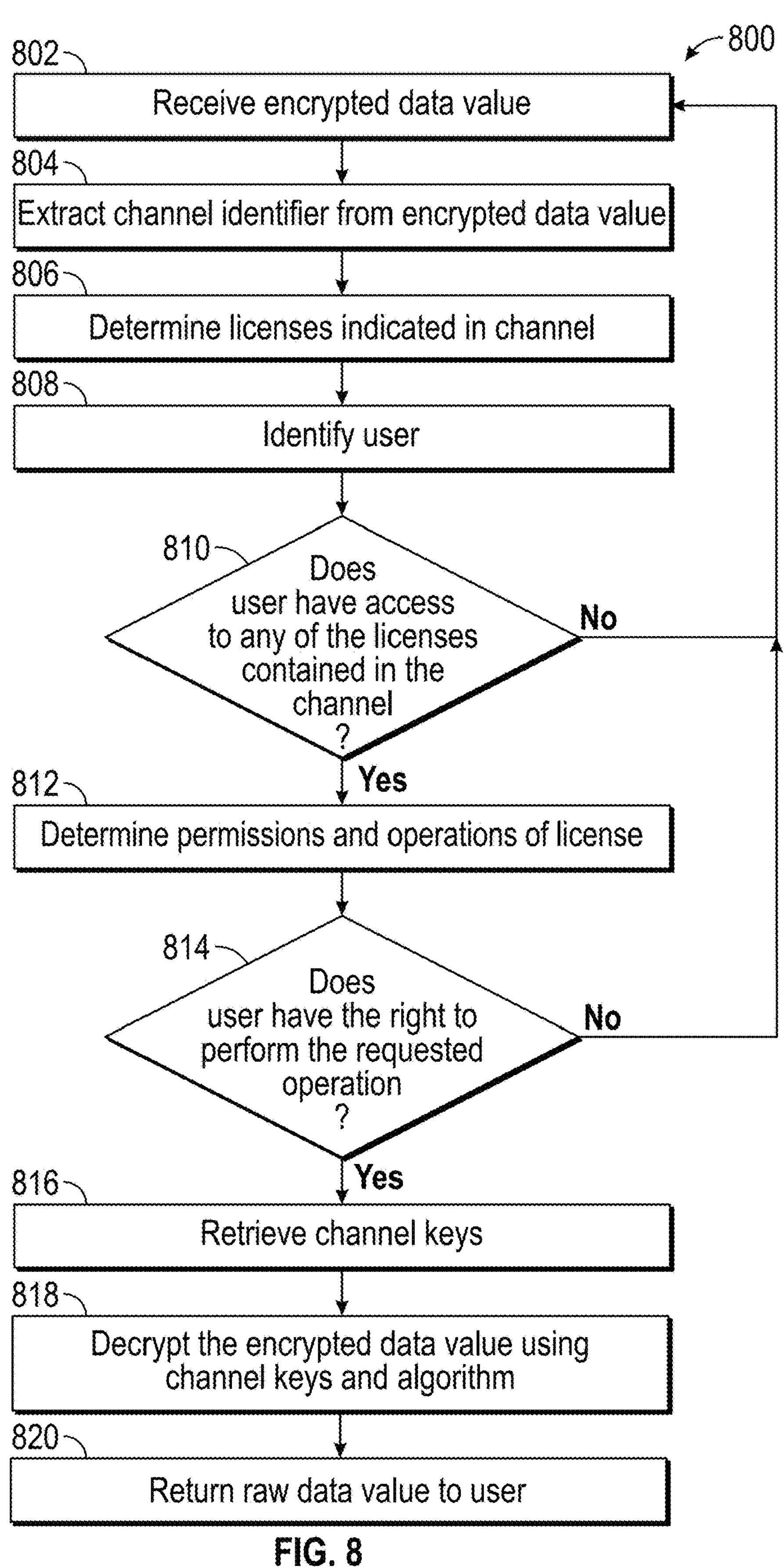
FIG. 8 is a flowchart illustrating an example process for decrypting data with the cryptography administration system.

FIG. 8 is a flowchart illustrating an example process 800 for decrypting data, such as with the cryptography administration system 105. Depending on the embodiment, the method of FIG. 8 may include fewer or additional blocks and/or the blocks may be performed in an order that is different than illustrated.

Beginning at block 802, the cryptography administration system 105 receives an encrypted data value, such as an encrypted data value that includes a channel identifier portion and an encrypted data portion. The encrypted data value may be received from a user 131 as part of a request to decrypt the data, for example when a user 131 selects the encrypted data value 708*b* displayed in user interface 702*a* of FIG. 7A.

Next, at block 804 the cryptography administration system 105 may extract the channel identifier from the received encrypted data value (e.g., identify the channel that is associated with the received encrypted data value). For example, the received encrypted data value may comprise a channel identifier (e.g., in the channel identifier portion 320 of the encrypted data values 314*a* shown in FIG. 3B). The channel identifier may comprise the metadata for identifying, retrieving, and/or otherwise accessing the indicated channel. For example, the channel identifier may point to the channel's location in storage, such as in data storage 114, along with the channel's associated license(s), key(s), and/or algorithm(s).

At block 806, the cryptography administration system 105 identifies any licenses associated with (e.g., included in) the accessed channel. As noted above, a channel may be associated with one or more licenses as shown in FIG. 5.

At block 808, the cryptography administration system 105 may identify the user 131 requesting the decryption, for example, based on a user identifier included in the decryption request.

Moving to block 810, the cryptography administration system 105 may determine whether the identified user 131 has access to any of the licenses associated with the channel. For example, in some implementations, the cryptography administration system 105 may determine all licenses associated with the channel and may determine if the user 131 has access to any of them. As another example, in some implementations, the cryptography administration system 105 may determine all licenses to which the user 131 has access and compare them with licenses associated with the channel, as determined at block 806, to determine if the user 131 has access to any of the licenses associated with the channel. As another example, in some implementations the cryptography administration system 105 may determine all users with access to the licenses associated with the channel and compare them with the user 131 to determine if the user 131 has access to any of the licenses associated with the channel.

If at block 810, the cryptography administration system 105 determines that the user 131 does not have access to any of the licenses associated with the channel, the cryptography administration system 105 will return to block 802 to receive any further requests to decrypt encrypted data values and will not return a decrypted raw data value to the user 131. If at block 810 the cryptography administration system 105 determines that the user 131 does have access to at least one of the licenses associated with the channel, the cryptography administration system 105 will continue to block 812.

At block 812, the cryptography administration system 105 determines the permissions and operations included in the license that is associated with the channel and to which the user 131 has been authorized to access. As discussed with reference to FIG. 6, a license may include various operations, permissions and other parameters which may be set by an administrator 111. As discussed, the permissions and operations included in a license may determine the rights of the user 131 to perform operations via the channel.

As discussed, a user 131 may lack the right to interact with the channel in the requested manner for a variety of reasons such as the license does not allow the user 131 to perform that operation, the license allows the user to perform the operation, but not at the permission level requested (e.g., requesting bulk column decryption when only allowed single value decryption), the license allows the user to perform the operation, but not at the rate requested (e.g., user 131 has requested more operations than allowed in a given time frame), and/or the user 131 has failed to submit an adequate justification for the operation, for example when prompted.

At block 814, the cryptography administration system 105 determines whether the user 131 has the right, according to the permission and operations of the license determined at block 812, to perform the requested operation (e.g., decryption).

If at block 814, the cryptography administration system 105 determines that the license does not grant the user 131 the right to perform the requested operation (e.g., decryption), the cryptography administration system 105 will return to block 802 to receive any further requests to decrypt encrypted data values and will not return a decrypted raw data value to the user 131. If at block 814, the cryptography administration system 105 determines that the license grants the user 131 the right to perform the requested operation (e.g., decryption), the cryptography administration system 105 will continue to block 816.

As described in steps 802-814 of the example process 800, interacting with the channel to perform operations such as encryption and decryption is restricted in a secure manner by limiting the rights of users, via licenses, to so interact. Advantageously, the rights of users to interact with the channel may be included in the licenses which in turn may be associated with the channel which in turn may be included in (e.g., identifiable/retrievable by) the encrypted data values (e.g., channel identifier 320). Thus, the rights of users 131 to interact with the channel to perform operations on the encrypted data are determinable from the encrypted data values alone, without requiring the user to provide separate indications of the channel or license, or any parameters of the channel or license. Thus, the information needed to determine permission for cryptographic operations can be included in encrypted data values external to the cryptography administration system 105 (e.g., at the user device 130) while still remaining secure.

At block 816, the cryptography administration system 105 retrieves the cryptographic keys associated with the channel, for example from the data storage 114. Advantageously, the user 131 is not required to have direct access to the cryptographic keys to perform cryptographic operations on the data. Rather, as shown in the example process 800, the cryptographic keys and/or access thereto may be included in the channel. Advantageously, by not requiring a user 131 to have direct access to, or a technical understanding of, cryptographic keys, performing cryptographic operations with the cryptography administration system 105 will be simpler for the user 131 compared to traditional cryptography focused systems and will also be more secure by avoiding human error associated with key sharing in traditional cryptography focused systems.

At block 818, the cryptographic system 105 decrypts the received encrypted data value using the cryptographic key(s) and algorithm(s) associated with the channel. Advantageously, the user 131 is not required to have a technical understanding of the cryptographic key(s) and/or algorithm(s) to decrypt the data.

At block 820, the cryptography administration system 105 returns the decrypted raw data value to the user 131.

Example process 800 is given as an example of performing operations with the cryptography administration system 105, for example, encryption using channels, and is not meant to be limiting of the present disclosure.

Example Process of Retrieving Encrypted Data in the Cryptography Administration System In some implementations, a user 131 may search the cryptography administration system 105 for encrypted data. For example, as discussed above, a user 131 employee at a financial institution may wish to search for data relating to a customer calling with inquiries. As shown in the user interface 702*a* of FIG. 7A, a user 131 may enter a search term, such as "Cindy" to retrieve encrypted data, and possibly some unencrypted data, associated with the search term "Cindy". The cryptography administration system 105 may search for encrypted data associated with the search term "Cindy" and return encrypted data values 708, such as the encrypted account number 708*a* and the encrypted full name 708*b* associated with the search term "Cindy". The cryptography administration system 105 may search for encrypted data related to the search term by encrypting the search term according to a specified channel as discussed with reference to FIG. 9. Furthermore, because searching may require encrypting the search term, a user's 131 ability to search for data may depend on the rights of the user 131 (e.g., to encrypt) as determined by the license(s) associated with the channel and to which the user 131 has access.

Figure 9:
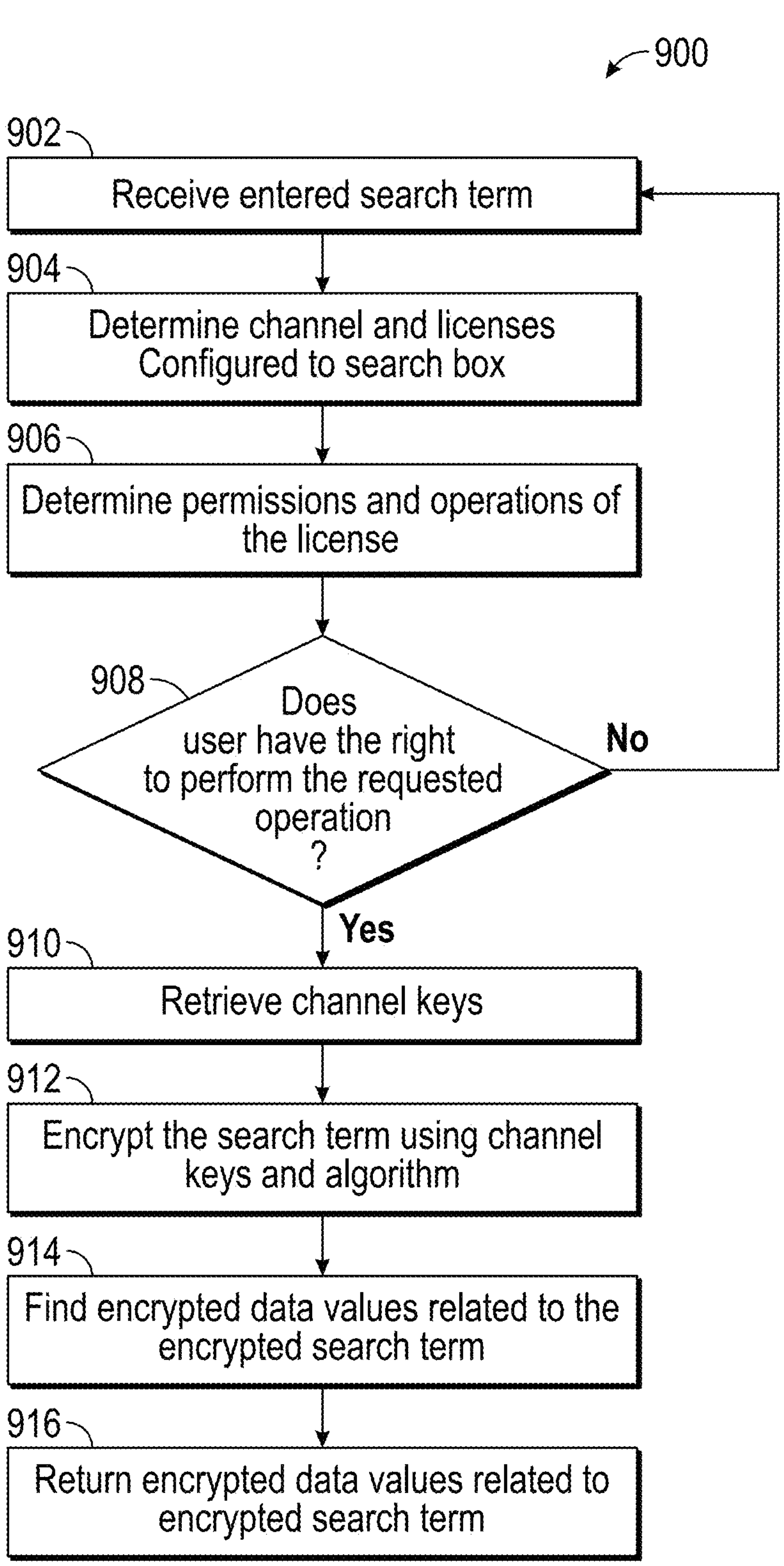
FIG. 9 is a flowchart illustrating an example process of searching the cryptography administration system for encrypted data to return to a user.

FIG. 9 is a flowchart illustrating an example process 900 of searching the cryptography administration system 105 for encrypted data to return to a user 131. Depending on the embodiment, the method of FIG. 9 may include fewer or additional blocks and/or the blocks may be performed in an order that is different than illustrated.

At block 902, the cryptography administration system 105 receives a search term entered by a user 131. The search term may be entered at a user device 130 via a user interface generated by the interface component 112. The user interface may comprise a search box as illustrated in example user interface 702*a* for the user 131 to enter a search term. The search box may be configured to be associated with a channel and license. In some implementations, the search box may be configured to be associated with more than one license and/or more than one channel. In some implementations, an administrator 111 may configure the search box to be associated with a channel and/or license. In some implementations, a software developer or programmer may configure the search box to be associated with a channel and/or license. In some implementations, the cryptography administration system 105 may automatically configure the search box to be associated with a channel and/or license, for example, based on information such as the identity of the user 131. In some implementations, a user 131 may configure the search box to be associated with a channel and/or license, for example, by entering a channel and/or license via a justification prompt. Encrypted data may be located in other manners, such as by a user navigating a hierarchical structure to select a record or group of records that the user wishes to view.

At block 904, the cryptography administration system 105 determines the channel(s) and license(s) associated with the search box. At block 906, the cryptography administration system 105 determines the permissions and operations of the license(s) associated with the search box and to which the user 131 has access.

At block 908, the cryptography administration system 105 determines whether the user 131 requesting to perform the search has the right to perform the search. Because performing the search may require encrypting the search term, as will be described below, the determination at block 908 may be based on the permissions and/or operations of the license associated with the search box and to which the user 131 has access, for example whether the user 131 has the necessary permissions to perform encryption. The determination at block 908 of example process 900 may be similar to the determination at block 814 of example process 800, as described herein. The cryptography administration system 105 will return to block 902 to receive any further entered search terms if the user 131 does not have the right to perform the search (e.g., there is not a license associated with the user 131 that provides permission for encrypting the search term using the encryption algorithm identified in the associated channel) and will continue to block 910 if the user 131 does have the right to perform the search.

At block 910, the cryptography administration system 105 retrieves the channel key(s) of the channel associated with the search box. Retrieving the channel key(s) at block 910 of example process 900 may be similar to retrieving the channel key(s) at block 816 of example process 800.

At block 912, the cryptography administration system 105 encrypts the search term. The encryption may be performed according to the channel key(s) and algorithm(s) of the channel associated with the search box. Advantageously, the user 131 is not required to have a technical understanding of the cryptographic key(s) and/or algorithm(s) to encrypt the data.

At block 914, the cryptography administration system 105 searches for encrypted data values related to the encrypted search term. For example, the cryptography administration system 105 may search the data storage 114 for matching encrypted data values. The cryptography administration system 105 may index encrypted data, for example in the data storage 114, when it is encrypted to allow for faster, more efficient searches of the encrypted data. In some implementations, an encrypted data value may be related to the encrypted search term if the two encrypted values share common information, such as the search term or some other commonality. For example, as shown in FIG. 3B, encrypted data values in the same row (e.g., 314*a*, 314*b*, 314*c*) may be related. In the example of FIG. 7A, based on the encrypted search term from the search term "Cindy", the cryptography administration system 105 may find the related encrypted data values for account number and street address (314*a* and 314*c*, respectively, of FIG. 3B).

At block 916, the cryptography administration system 105 returns encrypted data values found at block 914 to the user 131. The encrypted data values that are returned to the user 131 at block 916 may be displayed to the user via a user interface, for example in a manner similar to the encrypted data values 708 displayed via user interface 702*a*.

Example process 900 is given as an example of performing operations with the cryptography administration system 105, for example encryption using channels, and is not meant to be limiting of the present disclosure.

Example Auditing of Channel and License Activity

Figure 10:
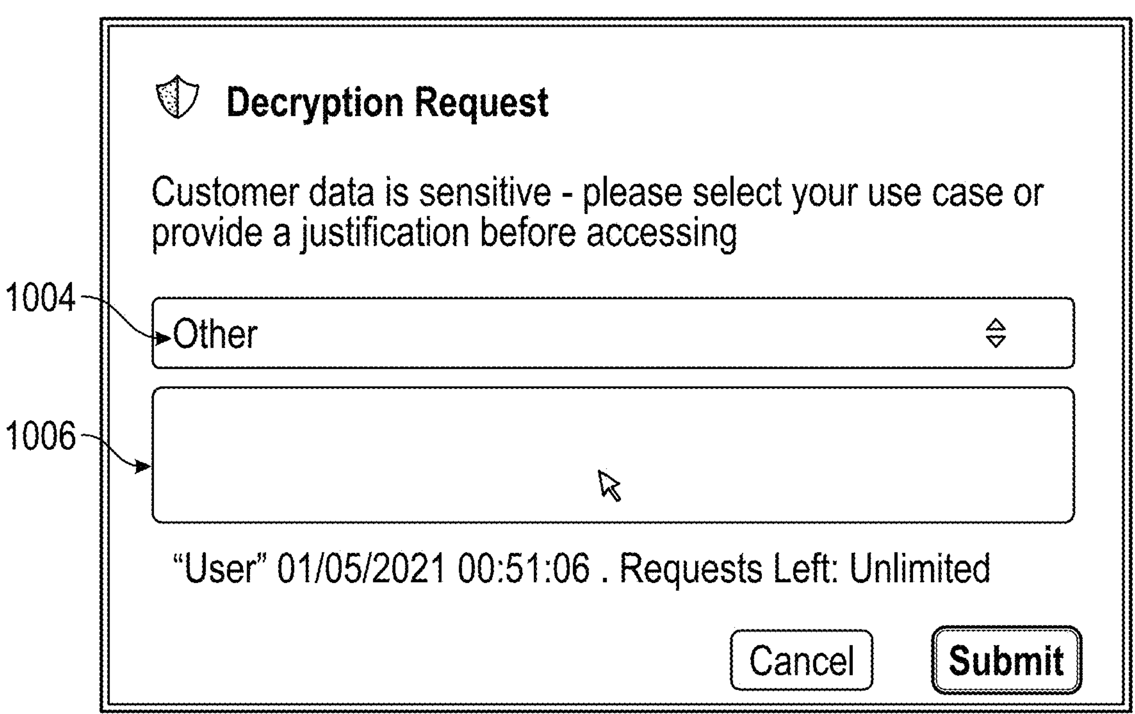
FIG. 10 is an example user interface of a justification prompt.

FIG. 10 is an example user interface of a justification prompt 1002 that may be generated by the interface component 112 and/or by a front-end software application and displayed to a user 131 via a user device 130. Justification prompts may be displayed to a user 131 when the user 131 is attempting to perform a cryptographic operation with the cryptography administration system 105. For example, the interface component 112 may display a justification prompt when the user 131 is attempting to decrypt or encrypt data or when attempting to search encrypted data as discussed with reference to FIG. 9. The justification prompt may be displayed prior to initiating the steps of example process 800 or example process 900. A justification prompt may be displayed according to the settings included in the license and/or channel that is being used to perform a cryptographic operation.

A justification prompt 1002 may include a prompt question or instructions and one or more selectable justification options. In the example of FIG. 10, a justification options field may allow the user to select from a list of options and/or to type in a justification option. For example, the justification options field 1004 may display in a drop-down menu options such as "response to customer inquiry" and "Other," as shown in FIG. 10. The justification prompt 1002 may include an input dialogue box 1006 into which the user 131 may enter a justification option not shown in the list 1004. The input dialogue box 1006 may appear when the user 131 selects "Other" as the justification option from the list 1004. In some implementations, the user 131 must enter an appropriate justification option for the cryptography administration system 105 to perform the requested operation.

The cryptography administration system 105 may monitor cryptographic activities, for example operations, performed with a specific channel. The cryptography administration system 105 may generate an audit log for a channel. In some embodiments, all of the cryptographic activities, for example, associated with a channel, are recorded in an audit log. The audit log and/or audit log data may be stored in a data store such as the data storage 114. The audit log and/or data contained in the audit log may be indexed (e.g., in a data store such as the data storage 114) for efficient search, retrieval and review workflows. For example, a user, such as an administrator 111 and/or a user 131 may search a data store for audit data, for example, via an interface to review a history of data pertaining to cryptographic actions that have been performed e.g., using the system. For example, a user may be able to search audit data stored in a data store by date, user, action type (e.g., decryption, encryption), rate (e.g., bulk, column, rate-limited) etc. in order to retrieve specific information for reviewing cryptographic actions. For example, a user (e.g., reviewer) may search a data store by user to find all cryptographic operations performed by that user. As another example, a user (e.g., reviewer) may search a data store by date (or time) to find all cryptographic operations performed within certain dates (and/or times). A user (e.g., reviewer) may combine search criteria and/or search filters to improve efficiency of searching audit data, such as by searching cryptographic audit data by user and by date. As discussed, audit data may be indexed (e.g., stored in a data store) in a manner to optimize efficient search and retrieval. This may improve review workflows for users desiring to review cryptographic operations that have been performed using the system. The interface component 112 may generate a visual display of an audit log and/or audit data to display to a user, such as an administrator 111 and/or a user 131 or other user desiring to review audit data via an admin device 110 and/or user device 130.

The audit log may include information such as the date and time that an operation was requested to be performed with a channel, the type of operation requested, the justification for the operation given by the user 131, the identity and the location of the user 131. Information may be saved to the audit log when a channel is used to perform an operation and/or attempted to be used to perform an operation. For example, information may be saved to the audit log at any of the steps of example process 800 or example process 900, such as upon determining, from the license, that a user 131 has a right to perform a requested operation at block 814 or block 908, respectively.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, declarative programming languages, such as SQL, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system configured to provide a cryptography administration system, the computing system comprising:

one or more hardware computer processors configured to execute program instructions to cause the computing system to:

generate an encrypted data value from one or more raw data values with a selected cryptography algorithm, wherein at least a portion of the encrypted data value comprises a channel identifier that points to a location in storage comprising a cryptography key for decrypting the encrypted data value, wherein another portion of the encrypted data value comprises an encrypted data portion corresponding to the one or more raw data values;

generate a license comprising one or more permissions to decrypt the encrypted data value;

configure the license with a justification prompt for receiving a justification for performing a cryptographic operation;

configure the justification prompt to solicit the justification responsive to a request to perform the cryptographic operation, wherein the computing system is configured to deny the request without the justification; and store the license with information for generating the justification prompt in the location in storage accessible by the channel identifier of the encrypted data value.

2. The computing system of claim 1 wherein the one or more hardware computer processors are configured to execute the program instructions to cause the computing system to:

generate the encrypted data value responsive to a user selection via an interactive user interface.

3. The computing system of claim 1 wherein the one or more permissions comprises a rate at which decryption operations may be performed.

4. The computing system of claim 1 wherein the one or more hardware computer processors are configured to execute the program instructions to cause the computing system to:

store the selected cryptography algorithm in the location in storage accessible by the channel identifier of the encrypted data value, the selected cryptography algorithm comprising a configured algorithm, a preconfigured algorithm, or a third-party configured algorithm.

5. The computing system of claim 1, wherein the justification prompt comprises a prompt question and one or more justification options.

6. The computing system of claim 1, wherein at least a portion of the channel identifier is hidden from view within a graphical user interface.

7. The computing system of claim 1, wherein the one or more hardware computer processors are configured to execute the program instructions to cause the computing system to:

access the cryptography key from the location in storage with the channel identifier to decrypt the encrypted data value responsive to user selection of the encrypted data value via a graphical user interface.

8. A computer-implemented method comprising:

by one or more hardware computer processors executing program instructions:

generating an encrypted data value from one or more raw data values with a selected cryptography algorithm, wherein at least a portion of the encrypted data value comprises a channel identifier that points to a location in storage comprising a cryptography key for decrypting the encrypted data value, wherein another portion of the encrypted data value comprises an encrypted data portion corresponding to the one or more raw data values;

generating a license comprising one or more permissions to decrypt the encrypted data value;

configuring the license with a justification prompt for receiving a justification for performing a cryptographic operation;

configuring the justification prompt to solicit the justification responsive to a request to perform the cryptographic operation;

configuring the license to allow the request responsive to receipt of the justification; and storing the license with information for generating the justification prompt in the location in storage accessible by the channel identifier of the encrypted data value.

9. The computer-implemented method of claim 8 further comprising:

generating the encrypted data value responsive to a user selection via an interactive user interface.

10. The computer-implemented method of claim 8 wherein the one or more permissions comprises a rate at which decryption operations may be performed.

11. The computer-implemented method of claim 8 further comprising:

storing the selected cryptography algorithm in the location in storage accessible by the channel identifier of the encrypted data value, the selected cryptography algorithm comprising a configured algorithm, a preconfigured algorithm, or a third-party configured algorithm.

12. The computer-implemented method of claim 8, wherein the justification prompt comprises a prompt question and one or more justification options.

13. Non-transitory computer-readable media including computer-executable instructions that, when executed by a computing system, cause the computing system to perform operations comprising:

generating an encrypted data value from one or more raw data values with a selected cryptography algorithm, wherein at least a portion of the encrypted data value comprises a channel identifier that points to a location in storage comprising a cryptography key for decrypting the encrypted data value, wherein another portion of the encrypted data value comprises an encrypted data portion corresponding to the one or more raw data values;

generating a license comprising one or more permissions to decrypt the encrypted data value;

configuring the license with a justification prompt for receiving a justification for performing a cryptographic operation;

configuring the justification prompt to solicit the justification responsive to a request to perform the cryptographic operation;

configuring the license to deny the request without the justification; and storing the license with information for generating the justification prompt in the location in storage accessible by the channel identifier of the encrypted data value.

14. The non-transitory computer-readable media of claim 13 wherein the computer-executable instructions, when executed by the computing system, cause the computing system to perform operations comprising:

generating the encrypted data value responsive to a user selection via an interactive user interface.

15. The non-transitory computer-readable media of claim 13 wherein the one or more permissions comprises a rate at which decryption operations may be performed.

16. The non-transitory computer-readable media of claim 13 wherein the computer-executable instructions, when executed by the computing system, cause the computing system to perform operations comprising:

storing the selected cryptography algorithm in the location in storage accessible by the channel identifier of the encrypted data value, the selected cryptography algorithm comprising a configured algorithm, a preconfigured algorithm, or a third-party configured algorithm.

17. The non-transitory computer-readable media of claim 13, wherein the justification prompt comprises a prompt question and one or more justification options.

* * * * *